(12) United States Patent
Inoue et al.

(10) Patent No.: US 10,005,447 B2
(45) Date of Patent: Jun. 26, 2018

(54) VEHICLE, CONTROLLER FOR VEHICLE, AND CONTROL METHOD FOR VEHICLE

(71) Applicant: TOYOTA JIDOSHA KABUSHIKI KAISHA, Toyota-shi, Aichi-ken (JP)

(72) Inventors: Toshio Inoue, Gotenba (JP); Shunsuke Fushiki, Susono (JP); Tomoaki Honda, Gotenba (JP); Keita Fukui, Fujinomiya (JP); Hidekazu Nawata, Gotenba (JP); Yuta Niwa, Mishima (JP); Taichi Ohsawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/032,579

(22) PCT Filed: Nov. 4, 2014

(86) PCT No.: PCT/IB2014/002323
§ 371 (c)(1),
(2) Date: Apr. 27, 2016

(87) PCT Pub. No.: WO2015/068011
PCT Pub. Date: May 14, 2015

(65) Prior Publication Data
US 2016/0272189 A1    Sep. 22, 2016

(30) Foreign Application Priority Data

Nov. 6, 2013  (JP) .................................. 2013-230163

(51) Int. Cl.
*B60W 20/13* (2016.01)
*B60W 10/26* (2006.01)
(Continued)

(52) U.S. Cl.
CPC ............... *B60W 20/13* (2016.01); *B60L 1/00* (2013.01); *B60L 3/0046* (2013.01); *B60L 3/04* (2013.01);
(Continued)

(58) Field of Classification Search
CPC ...... B60W 10/06; B60W 10/08; B60W 10/26; B60W 30/18054; B60W 20/40;
(Continued)

(56) References Cited

U.S. PATENT DOCUMENTS

2009/0024267 A1\* 1/2009 Kawai .................... B60K 6/445
701/22
2010/0133900 A1\* 6/2010 King ................... B60L 11/1816
307/9.1

(Continued)

FOREIGN PATENT DOCUMENTS

CN          103313894 A      9/2013
JP          2000-234539 A    8/2000
(Continued)

*Primary Examiner* — Thomas G Black
*Assistant Examiner* — Ce Li Li
(74) *Attorney, Agent, or Firm* — Oliff PLC

(57) ABSTRACT

A vehicle includes an engine, a first motor generator that is configured to generate electric power using the power of the engine, an electric storage device that is configured to store the electric power that is generated by the first motor generator, a connection part through which the electric power that has been stored in the electric storage device is supplied to the outside of the vehicle; and an ECU that is configured to start the engine when the SOC of the electric storage device reaches a predetermined starting threshold value. The ECU sets a starting threshold value ON2 that is used when the vehicle is in an undrivable condition and electric power is being supplied to the outside of the vehicle through the connection part to a value smaller than a starting (Continued)

threshold value ON1 that is used when the vehicle is in a drivable condition.

6 Claims, 6 Drawing Sheets

(51) Int. Cl.
| | |
|---|---|
| *B60W 10/06* | (2006.01) |
| *B60L 1/00* | (2006.01) |
| *B60L 11/02* | (2006.01) |
| *B60L 11/18* | (2006.01) |
| *F01N 3/20* | (2006.01) |
| *B60W 10/08* | (2006.01) |
| *B60W 30/18* | (2012.01) |
| *B60W 20/40* | (2016.01) |
| *B60L 3/00* | (2006.01) |
| *B60L 3/04* | (2006.01) |
| *B60L 7/14* | (2006.01) |
| *B60L 11/00* | (2006.01) |
| *B60L 11/12* | (2006.01) |
| *B60L 11/14* | (2006.01) |
| *B60L 15/20* | (2006.01) |
| *B60W 20/16* | (2016.01) |

(52) U.S. Cl.
CPC ............... *B60L 7/14* (2013.01); *B60L 11/005* (2013.01); *B60L 11/02* (2013.01); *B60L 11/123* (2013.01); *B60L 11/14* (2013.01); *B60L 11/1809* (2013.01); *B60L 11/1816* (2013.01); *B60L 11/1842* (2013.01); *B60L 11/1844* (2013.01); *B60L 11/1846* (2013.01); *B60L 11/1859* (2013.01); *B60L 11/1861* (2013.01); *B60L 15/20* (2013.01); *B60L 15/2009* (2013.01); *B60W 10/06* (2013.01); *B60W 10/08* (2013.01); *B60W 10/26* (2013.01); *B60W 20/16* (2016.01); *B60W 20/40* (2013.01); *B60W 30/18054* (2013.01); *F01N 3/2006* (2013.01); *B60L 2210/10* (2013.01); *B60L 2210/30* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/547* (2013.01); *B60L 2240/549* (2013.01); *B60L 2240/80* (2013.01); *B60L 2260/26* (2013.01); *B60W 2510/244* (2013.01); *B60W 2520/04* (2013.01); *B60W 2530/12* (2013.01); *B60W 2710/06* (2013.01); *B60W 2710/244* (2013.01); *B60Y 2200/92* (2013.01); *B60Y 2300/474* (2013.01); *B60Y 2300/51* (2013.01); *B60Y 2300/91* (2013.01); *Y02E 60/721* (2013.01); *Y02T 10/6217* (2013.01); *Y02T 10/6286* (2013.01); *Y02T 10/645* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01); *Y10S 903/93* (2013.01)

(58) Field of Classification Search
CPC ................. B60W 20/13; B60W 20/16; B60W 2510/244; B60W 2530/12; B60W 2710/244; B60W 2710/06; B60L 1/00; B60L 3/0046; B60L 3/04; B60L 7/14; B60L 11/02; B60L 11/005; B60L 11/123; B60L 11/14; B60L 11/1809; B60L 11/1816; B60L 11/1842; B60L 11/1844; B60L 11/1846; B60L 11/1859; B60L 11/1861; B60L 15/20; B60L 15/2009; B60L 2210/10; B60Y 2300/91; B60Y 2300/474; B60Y 2300/51; B60Y 2200/92; Y02T 10/7077; Y02T 10/7044; Y02T 10/7005; Y02T 10/705; Y02T 10/7241; Y02T 10/7022; Y02T 10/7072; Y02T 10/645; Y02T 10/7275; Y02T 10/7216; Y02T 90/163; Y02T 90/169; Y02T 10/6217; Y02T 90/121; Y02T 90/14; Y02T 90/128; Y02T 90/127

See application file for complete search history.

(56) References Cited

U.S. PATENT DOCUMENTS

| | | | |
|---|---|---|---|
| 2013/0030634 A1 | 1/2013 | Endo et al. | |
| 2013/0297193 A1* | 11/2013 | Morisaki | B60K 6/445 701/112 |
| 2014/0163801 A1* | 6/2014 | Sato | B60K 6/445 701/22 |

FOREIGN PATENT DOCUMENTS

| | | |
|---|---|---|
| JP | 2007-236023 A | 9/2007 |
| WO | 2011/125184 A1 | 10/2011 |

\* cited by examiner

VEHICLE, CONTROLLER FOR VEHICLE, AND CONTROL METHOD FOR VEHICLE

BACKGROUND OF THE INVENTION

1. Field of the Invention

The present invention relates to a vehicle, and, more specifically, to a vehicle that is equipped with an external power supply part that is used to supply electric power to the outside of the vehicle, a controller for the vehicle, and a control method for the vehicle.

2. Description of Related Art

In recent years, plug-in hybrid vehicles that can be charged from a commercial power source are commercially available. Plug-in hybrid vehicles can also provide electric power to an electric device, power grid or the like outside the vehicle (which may be hereinafter also referred to as "external power supply") (refer to Japanese Patent Application Publication No. 2007-236023 (JP 2007-236023 A), for example).

When the engine is frequently started, fuel consumption increases. It is, therefore, desirable for hybrid vehicles to avoid starting the engine as much as possible to reduce fuel consumption. Thus, techniques that are used to determine whether to start the engine of a hybrid vehicle have been proposed. For example, a controller for a hybrid vehicle that is disclosed in WO2011/125184 has a determination part that determines whether to start the internal combustion engine based on an allowable discharge capacity. The allowable discharge capacity indicates the electric power that the electric storage device can discharge.

A catalyst that is used to purify the exhaust gas is provided in an exhaust pipe that is coupled to the engine. The catalyst fulfills its purifying function when it is sufficiently warmed. Thus, for example, when the engine is started, warm-up to increase the temperature of the catalyst (which may be hereinafter also referred to as "catalyst warm-up") is executed. For example, a controller for a hybrid vehicle that is disclosed in Japanese Patent Application Publication No. 2000-234539 (JP 2000-234539 A) maintains the engine speed at a predetermined level or higher to activate the catalyst as exhaust gas purifying means when the vehicle is in a power generation mode for external power supply.

SUMMARY OF THE INVENTION

There is a great demand for reduction of fuel consumption of hybrid vehicles. Plug-in hybrid vehicles are also required to reduce fuel consumption during power supply to the outside of the vehicle.

The present invention has been made to solve the above problem, and it is, therefore, an object of the present invention to provide a vehicle that can reduce fuel consumption during power supply to the outside of the vehicle, a controller for the vehicle and a control method for the vehicle.

In a first aspect of the present invention, a vehicle includes an internal combustion engine, a power generator, an electric storage device, an external power supply part, and a controller. The power generator is configured to generate electric power using the power of the internal combustion engine. The electric storage device is configured to store electric power that is generated by the power generator. The external power supply part is provided in an outer surface of the vehicle. The electric power stored in the electric storage device is supplied to the outside of the vehicle through the external power supply part. The controller is configured to start the internal combustion engine when the state of charge of the electric storage device reaches a predetermined lower limit value. The controller is configured to set the lower limit value used when the vehicle is in an undrivable condition and during electric power is supplied to the outside of the vehicle through the external power supply part to a value smaller than the lower limit value used when the vehicle is in a drivable condition.

According to this aspect, the frequency of the internal combustion engine when the vehicle is in an undrivable condition and during electric power is supplied to the outside of the vehicle through the external power supply part is less than that when the vehicle is in a drivable condition. Thus, the fuel consumption during power supply to the outside of the vehicle can be reduced.

In this aspect, the vehicle may further include a catalyst device. The catalyst device is configured to purify the exhaust gas that is discharged from the internal combustion engine. The internal combustion engine warms up the catalyst device using the exhaust gas. The controller may prohibit warm-up of the catalyst device by the internal combustion engine until the state of charge of the electric storage device reaches the lower limit value.

According to this aspect, even when the internal combustion engine is repeatedly started and stopped, the internal combustion engine is not started unless the state of charge of the electric storage device reaches the lower limit value. Thus, fuel is prevented from being consumed to warm up the catalyst device. Thus, the fuel consumption during power supply to the outside of the vehicle can be further reduced.

In a second aspect of the present invention, a vehicle includes an internal combustion engine, a power generator, an electric storage device, an external power supply part, and a controller. The power generator is configured to generate electric power using power of the internal combustion engine. The electric storage device is configured to store electric power that is generated by the power generator. The external power supply part is provided in an outer surface of the vehicle. The electric power stored in the electric storage device is supplied to the outside of the vehicle through the external power supply part.

The controller is configured to set a first threshold value as a threshold value when the vehicle is in an undrivable condition and during electric power is supplied to the outside of the vehicle through the external power supply part. The controller is configured to set a second threshold value as the threshold value when the vehicle is in a drivable condition. The first threshold value is greater than the second threshold value. The controller is configured to start the internal combustion engine when the state of charge of the electric storage device reaches the threshold value.

In a third aspect of the present invention, a vehicle includes an internal combustion engine, a power generator, an electric storage device, an external power supply part, and a controller. The power generator is configured to generate electric power using power of the internal combustion engine. The electric storage device is configured to store electric power that is generated by the power generator. The external power supply part is provided in an outer surface of the vehicle. The electric power stored in the electric storage device is supplied to the outside of the vehicle through the external power supply part. The controller for a vehicle includes an ECU. The ECU is configured to start the internal combustion engine when the state of charge of the electric storage device reaches a predetermined lower limit value. The ECU configured to set the lower limit value used when the vehicle is in an undrivable condition and during electric power is supplied to the outside of the vehicle through the external power supply part to a value smaller than the lower limit value used when the vehicle is in a drivable condition.

In a fourth aspect of the present invention, a vehicle includes an internal combustion engine, a power generator, an electric storage device, an external power supply part, and an ECU. The power generator is configured to generate electric power using power of the internal combustion engine. The electric storage device is configured to store electric power that is generated by the power generator. The external power supply part is provided in an outer surface of the vehicle. The electric power stored in the electric storage device is supplied to the outside of the vehicle through the external power supply part. The control method for a vehicle includes starting the internal combustion engine, by ECU, when the state of charge of the electric storage device reaches a predetermined lower limit value. The control method for a vehicle also includes setting the lower limit value used when the vehicle is in an undrivable condition and during electric power is supplied to the outside of the vehicle through the external power supply part, by ECU, to a value smaller than the lower limit value used when the vehicle is in a drivable condition.

According to the present invention, the fuel consumption during power supply to the outside of the vehicle can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
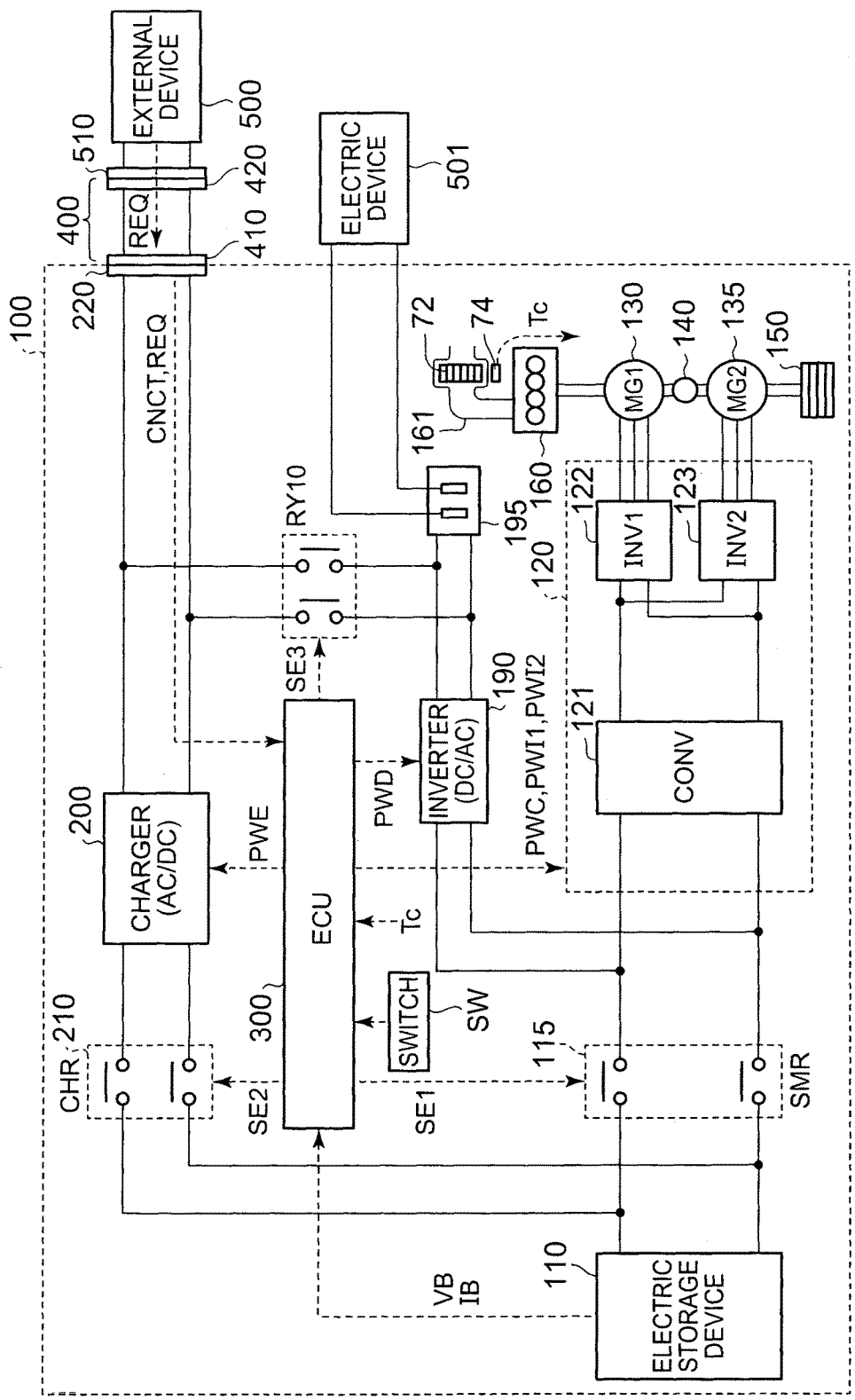
FIG. 1 is a block diagram that schematically illustrates the configuration of a vehicle according to a first embodiment.

Embodiments of the present invention are described below in detail with reference to the drawings. The same or corresponding components are denoted in all the drawings by the same reference numerals and their description is not repeated.

A first embodiment is described. FIG. 1 is a block diagram that schematically illustrates the configuration of a vehicle according to a first embodiment. Referring to FIG. 1, a vehicle 100 is a plug-in hybrid vehicle. The vehicle 100 includes an electric storage device 110, an SMR (System Main Relay) 115, a PCU (Power Control Unit) 120, a first motor generator 130, a second motor generator 135, a power transmission gear 140, driving wheels 150, an engine 160 and an ECU (Electronic Control Unit) 300.

The ECU 300 (controller) receives signals from sensors and so on which are described later, and controls the vehicle 100 by outputting signals to constituent elements of the vehicle 100.

The engine 160 is an internal combustion engine, such as a gasoline engine or diesel engine.

The electric storage device 110 is a DC power source that is configured to be able to be charged and discharged. The electric storage device 110 supplies electric power that is used to generate driving force for driving the vehicle 100 to the PCU 120. Also, the electric storage device 110 stores electric power that is generated by the first motor generator 130 and the second motor generator 135. As the electric storage device 110, a secondary battery, such as a lithium ion battery or nickel-hydrogen battery, or a capacitor, such as an electric double layer capacitor, may be used.

The electric storage device 110 includes a voltage sensor and a current sensor (neither are shown). The voltage sensor detects a voltage VB of the electric storage device 110 and outputs a signal that indicates the voltage VB to the ECU 300. The current sensor detects an input-output current IB of the electric storage device 110 and outputs a signal that indicates the input-output current IB to the ECU 300. The ECU 300 calculates the state of charge (SOC) of the electric storage device 110 based on the detection values of the voltage VB and input-output current IB.

The SMR 115 is electrically connected between the electric storage device 110 and the PCU 120. The SMR 115 switches the supply and interruption of electric power between the electric storage device 110 and the PCU 120 based on a control signal SE1 from the ECU 300.

The PCU 120 drives the first motor generator 130 and the second motor generator 135. The PCU 120 includes a converter 121, an inverter 122, and an inverter 123. The converter 121 boosts the DC voltage that is supplied from the electric storage device 110 based on a control signal PWC from the ECU 300. The boosted DC voltage is supplied to the inverter 122 and the inverter 123. The inverter 122 converts the DC electric power from the converter 121 into AC electric power based on a control signal PWI1 from the ECU 300. The AC electric power that has been converted by the inverter 122 is supplied to the first motor generator 130. The inverter 123 converts the DC electric power from the converter 121 into AC electric power based on a control signal PWI2 from the ECU 300. The AC electric power that has been converted by the inverter 123 is supplied to the second motor generator 135.

The first motor generator 130 uses the electric power from the inverter 122 to rotate the crankshaft (not shown) as an output shaft of the engine 160. As a result, the first motor generator 130 starts the engine 160. The driving force of the first motor generator 130 is transmitted to the driving wheels 150 via the power transmission gear 140. The first motor generator 130 also uses power from the engine 160 that has been split by a power split mechanism (not shown) to generate electric power. The electric power that is generated by the first motor generator 130 is stored in the electric storage device 110 via the PCU 120.

The second motor generator 135 uses at least one of the electric power from the inverter 123 and the electric power that is generated by the first motor generator 130 to provide driving force to the driving wheels 150. The electric power that is generated through regenerative braking by the second motor generator 135 is stored in the electric storage device 110 via the PCU 120.

The vehicle 100 has a Ready ON state and a Ready OFF state. When the vehicle 100 is in the Ready OFF state, the SMR 115 is in a non-conductive state. Thus, when the vehicle 100 is in the Ready OFF state, no electric power is supplied from the electric storage device 110 to the first motor generator 130 and the engine 160 therefore cannot be started.

When the driver presses a power switch SW while depressing the brake pedal (not shown) when the vehicle 100 is in the Ready OFF state and the shift position is in the parking range, the vehicle 100 is shifted to the Ready ON state. When the vehicle 100 is in the Ready ON state, the SMR 115 is in a conductive state. Thus, when the vehicle 100 is in the Ready ON state, electric power can be supplied from the electric storage device 110 to the first motor generator 130 to start the engine 160.

The vehicle 100 is configured to be able to supply the electric power that has been stored in the electric storage device 110 to an external device 500 and an electric device 501. The vehicle 100 further includes an inverter 190, an outlet 195, a relay RY10 and a connection part 220 as means for external power supply.

The external device 500 and the electric device 501 are not specifically limited as long as they are devices that operate on AC electric power from the vehicle 100. The external device 500 may be a house or electric appliance, or a vehicle other than the vehicle 100, for example. In the following description, the supply of electric power to the external device 500 via the connection part 220 may be also referred to as "external power supply." The connection part 220 corresponds to the "external power supply part" of the present invention. The electric device 501 is an electric appliance, for example.

The inverter 190 converts the DC electric power from the electric storage device 110 into AC electric power based on a control signal PWD from the ECU 300. The AC electric power from the inverter 190 is supplied to the outlet 195 and is also supplied to the connection part 220 via the relay RY10. The AC electric power that is generated by the first motor generator 130 may be converted into DC electric power by the PCU 120 and the DC electric power may be converted into AC electric power by the inverter 190.

The outlet 195 is located in the cabin of the vehicle 100. The power plug (not shown) of the electric device 501 is inserted into the outlet 195.

The relay RY10 is electrically connected between the inverter 190 and the connection part 220. The relay RY10 switches the supply and interruption of electric power between the inverter 190 and the connection part 220 based on a control signal SE3 from the ECU 300.

The connection part 220 is provided in an outer surface of the vehicle 100 so that the electric power stored in the electric storage device 110 can be supplied to the outside of the vehicle 100. The electric power from the vehicle 100 is supplied to the external device 500 via the connection part 220 and a connection cable 400. More specifically, the connection part 220 is configured to be connectable to a coupling connector 410 that is provided at one end of the connection cable 400. A coupling connector 420 at the other end of the connection cable 400 is connected to a plug 510 of the external device 500.

The coupling connector 410 of the connection cable 400 includes a connection detection part (not shown). When the coupling connector 410 is connected to the connection part 220, the connection detection part outputs a connection signal CNCT to the ECU 300. When receiving the connection signal CNCT, the ECU 300 determines that the coupling connector 410 is connected to the connection part 220. When the coupling connector 410 is connected to the connection part 220, the vehicle 100 is in an undrivable condition.

The external device 500 outputs a power supply request signal REQ when it requires external power supply. The power supply request signal REQ is sent to the ECU 300 via the connection cable 400 and the connection part 220. When receiving the power supply request signal REQ, the ECU 300 determines that there is a power supply request from the external device 500.

In addition, the vehicle 100 is configured to be able to charge (external charge) the electric storage device 110 using AC electric power from the outside of the vehicle 100. When external charge is carried out, an AC electric power source (not shown), instead of the external device 500, is connected to the connection part 220. The AC electric power source may be a commercial power source or vehicle other than the vehicle 100, for example. The vehicle 100 further includes a charger 200 and a charging relay (which may be hereinafter also referred to as CHR) 210 as means for external charge.

The charger 200 converts the AC electric power from the connection part 220 into DC electric power based on a control signal PWE from the ECU 300. The DC electric power is stored in the electric storage device 110.

The CHR 210 is electrically connected between the charger 200 and the electric storage device 110. The CHR 210 switches the supply and interruption of DC electric power from the charger 200 to the electric storage device 110 based on a control signal SE2 from the ECU 300.

A catalyst converter 72 is provided in an exhaust passage 161 for the exhaust gas that is discharged from the engine 160. The catalyst converter 72 purifies the emissions (harmful substances such as hydrocarbons, carbon monoxide and nitrogen oxides) in the exhaust gas. However, when the temperature of the catalyst converter 72 is low, the catalyst converter 72 cannot sufficiently fulfill its purifying function. Thus, to make the catalyst converter 72 fulfill its purifying function sufficiently, the catalyst converter 72 must be warmed up. The catalyst converter 72 can be warmed up using the exhaust gas from the engine 160. The catalyst converter 72 corresponds to the "catalyst device."

A temperature sensor 74 used to detect a temperature Tc of the catalyst converter 72 is provided on the catalyst converter 72. The ECU 300 determines whether the catalyst warm-up has been completed based on the temperature Tc from the temperature sensor 74. In other words, the ECU 300 determines that the catalyst warm-up has been completed when the temperature Tc from the temperature sensor 74 exceeds a predetermined temperature that is high enough for the catalyst converter 72 to fulfill its purifying function.

During catalyst warm-up, the engine 160 is controlled to discharge exhaust gas that can be purified by the catalyst converter 72 still in the process of being warmed up. Thus, the driving force that is generated by the engine 160 is not used for the power generation in the first motor generator 130 until the catalyst warm-up is completed. Thus, when the engine 160 is started during external power supply, the SOC of the electric storage device 110 continues to decrease until the catalyst warm-up is completed. After the catalyst warm-up is completed, the driving force that is generated by the engine 160 is used for the power generation in the first motor generator 130. Thus, the SOC turns from decrease to increase when the catalyst warm-up is completed.

The vehicle 100 has a Charge Depleting mode (CD mode) and a Charge Sustaining mode (CS mode). The CD mode is a mode in which the electric power in the electric storage device 110 is not sustained but consumed. Thus, when the vehicle 100 is in the CD mode, the electric power that has been stored in the electric storage device 110 is used to drive the vehicle 100 or to provide an external power supply with the engine 160 stopped. In other words, when the vehicle 100 is in the CD mode, the power generation using the driving force of the engine 160 in the first motor generator 130 is not basically carried out.

On the other hand, the CS mode is a mode in which the electric power in the electric storage device 110 is sustained. Thus, when the vehicle 100 is in the CS mode, the engine 160 is started so that the SOC can be maintained within a predetermined control range while the vehicle 100 is traveling or carrying out external power supply. In other words, when the vehicle 100 is in the CS mode, the first motor generator 130 generates electric power using the driving force of the engine 160 and the electric storage device 110 is charged using the generated electric power. However, the SOC may not be necessarily maintained within the control range. In other words, the SOC may be maintained not to fall below a predetermined value. Alternatively, the engine 160 may be started to maintain the SOC at a predetermined value.

For easier understanding of this embodiment, the control over the engine in a first examination case is first described.

Figure 2:
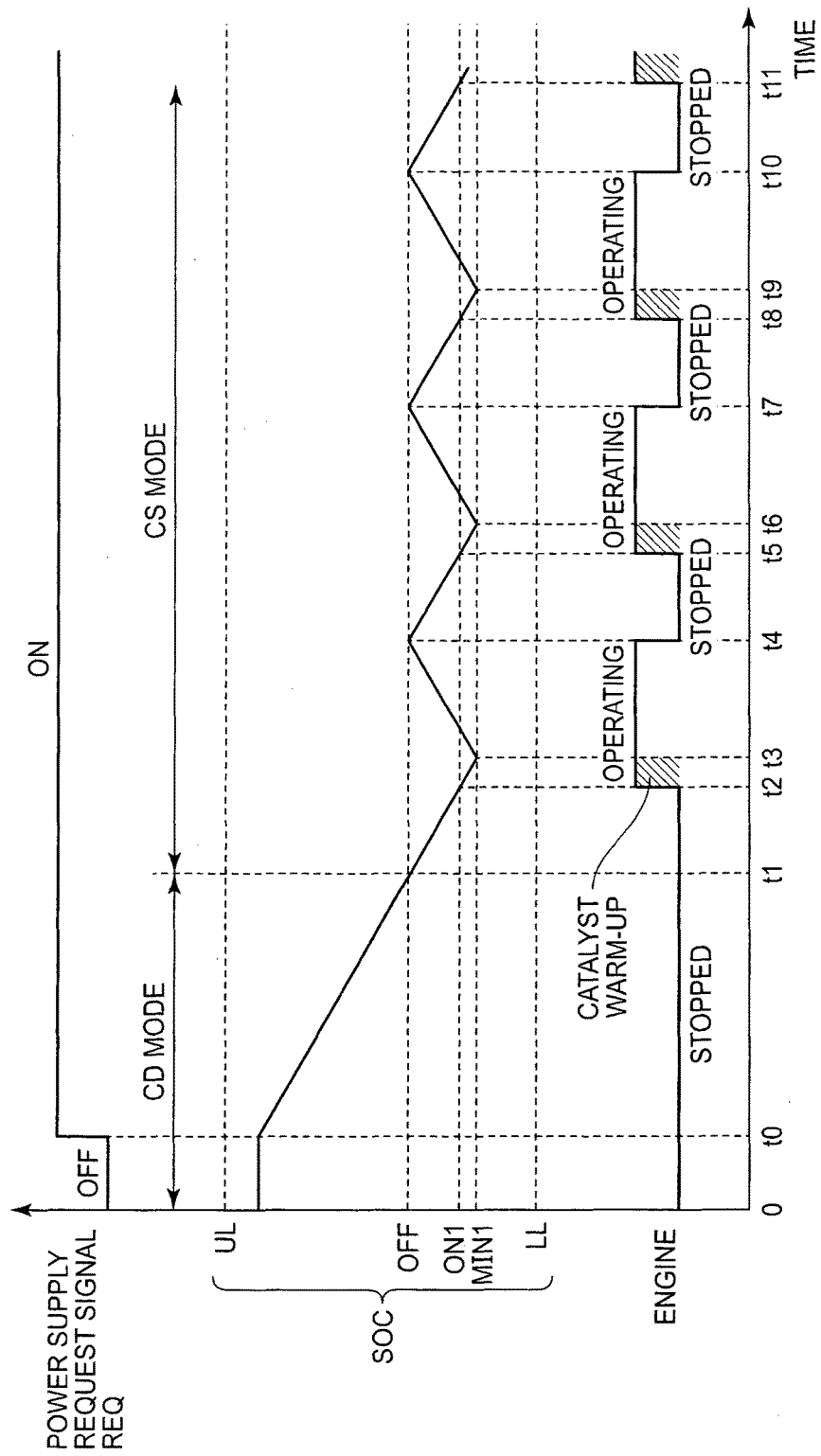
FIG. 2 is a timing chart that shows the control over the internal combustion engine during power supply to the outside of the vehicle in a first examination case.

FIG. 2 is a timing chart that shows the control over the engine 160 during external power supply in a first examination case. Referring to FIG. 2, the horizontal axis is a time axis. The vertical axis represents the on/off of the power supply request signal REQ, the SOC of the electric storage device 110, and the state of the engine 160, i.e., whether the engine 160 is operating or stopped.

The SOC of the electric storage device 110 has a UL and an LL. The UL is an upper limit value that is set to prevent overcharge of the electric storage device 110. The LL is a lower limit value that is set to prevent over discharge of the electric storage device 110. The SOC also has an ON1 and an OFF. The ON1 is a starting threshold value that is used to start the engine 160. The OFF is a stopping threshold value that is used to stop the engine 160. When the SOC falls below the stopping threshold value OFF, the vehicle 100 is shifted from the CD mode to the CS mode.

At a reference time (0), the SOC of the electric storage device 110 is higher than the stopping threshold value OFF and lower than the upper limit value UL. Thus, the vehicle 100 is in the CD mode. Also, because the power supply request signal REQ is off, the engine 160 is controlled to remain stopped.

The power supply request signal REQ is turned on at a time which is a period t0 after the reference time (which may be hereinafter also referred to as "time t0." This also applies to other times.). Then, external power supply is started. As described above, when the vehicle is in the CD mode, the electric power that has been stored in the electric storage device 110 is used to provide an external power supply with the engine 160 stopped. Thus, the SOC decreases from time t0 to time t1.

The SOC reaches the stopping threshold value OFF at time t1. Thus, the vehicle 100 is shifted from the CD mode to the CS mode.

The SOC reaches the starting threshold value ON1 at time t2. Thus, the engine 160 is controlled to start in order to warm up the catalyst converter 72. As described above, the driving force of the engine 160 is not used for the power generation in the first motor generator 130 during catalyst warm-up. Thus, the SOC continues to decrease from time t2 to time t3.

The catalyst warm-up is completed at time t3. At this time, the SOC takes a minimum value MIN1. Because the catalyst warm-up is completed, the electric storage device 110 starts to be charged. Thus, the SOC turns from decrease to increase.

The SOC reaches the stopping threshold value OFF at time t4. Thus, the engine 160 is stopped. Thus, the SOC turns from increase to decrease. Because the control over the engine 160 from time t5 onward is the same as the control from time t2 to time t5, no detailed description is repeated.

In the first examination case, the starting threshold value ON1 has been preliminarily set through an experiment or the like. When the starting threshold value ON1 is set, the following matters (1) to (3), for example, are taken into consideration. (1) Sufficient electric power for the first motor generator 130 to start the engine 160 must be secured in the electric storage device 110. (2) Catalyst warm-up can be carried out when the engine 160 is started. In other words, even when the SOC continues to decrease during catalyst warm-up, the electric storage device 110 does not fall into an over discharge state (the minimum value MIN1 of the SOC does not fall below the lower limit value LL). (3) Sufficient electric power to generate driving force for driving the vehicle 100 in response to an operation of the accelerator by the driver while the vehicle 100 is traveling must be secured in the electric storage device 110.

The control in the first embodiment is next described. According to the first embodiment, different starting threshold values are set depending on conditions. In other words, the starting threshold value that is set when the vehicle 100 is in a drivable condition is different from the starting threshold value that is set when the vehicle 100 is in an undrivable condition and during electric power is supplied to the outside of the vehicle 100.

More specifically, when the coupling connector 410 is connected to the connection part 220, the vehicle 100 is connected to the external device 500 via the connection cable 400. Thus, the vehicle 100 is in an "undrivable condition." In other words, the state where the vehicle 100 is "undrivable" includes a state where the coupling connector 410 is connected to the connection part 220.

On the other hand, the state where the vehicle 100 is "drivable" includes a state where the vehicle 100 is traveling. The state where the vehicle 100 is "drivable" is not limited to the state where the vehicle 100 is traveling and also includes a state where the vehicle 100 is stationary and the coupling connector 410 is not connected to the connection part 220. In other words, the state where the vehicle 100 is "drivable" includes a state where the vehicle 100 is temporally stopped and a state where the vehicle 100 is parked as long as the coupling connector 410 is not connected to the connection part 220.

When the vehicle 100 is in a "drivable condition," a starting threshold value ON1 is set in the same manner as in the first examination case, for example. On the other hand, when the vehicle 100 is in an "undrivable condition" and the electric power is being supplied to the outside of the vehicle 100, a starting threshold value ON2 is set. The starting threshold value ON2 is a value which is smaller than the starting threshold value ON1. The reason why the starting threshold value can set to a smaller value is as follows. The vehicle 100 is in an undrivable condition when external power supply is in progress. Thus, there is no need to secure sufficient electric power to generate driving force for driving the vehicle 100 in response to a request to start the vehicle 100 (electric power in view of the matter (3)) in the electric storage device 110.

Each of the starting threshold values ON1 and ON2 corresponds to the "lower limit value" of the present invention. In other words, the ECU 300 sets the starting threshold value ON2, which is used when the vehicle 100 is in an undrivable condition and electric power is being supplied to the outside of the vehicle 100 via the connection part 220, to a value smaller than the starting threshold value ON1, which is used when the vehicle 100 is in a drivable condition. When the coupling connector 410 is connected to the connection part 220 but no electric power is being supplied to the outside of the vehicle 100, either of the starting threshold values ON1 and ON2 may be set because the SOC remains constant.

Figure 3:
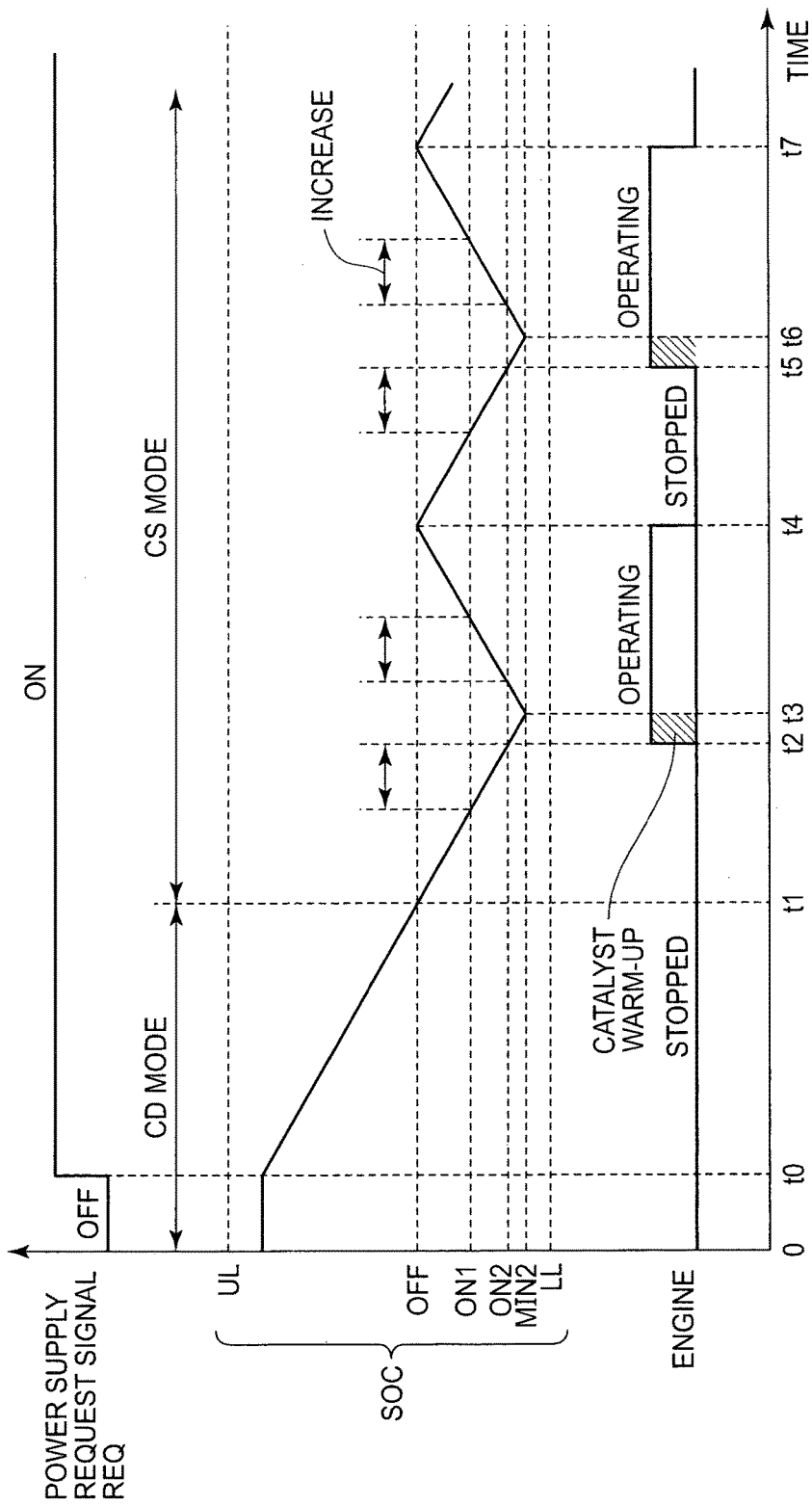
FIG. 3 is a timing chart that shows the control over the internal combustion engine during power supply to the outside of the vehicle in a first embodiment.

FIG. 3 is a timing chart that shows the control over the engine 160 during external power supply in the first embodiment. FIG. 3 is compared to FIG. 2. Because the control until time t1 that is shown in FIG. 3 is the same as the control until time t1 that is shown in the first examination case, no detailed description is repeated.

The SOC reaches the starting threshold value ON2 at time t2. Thus, the engine 160 is controlled to start in order to warm up the catalyst converter 72. The driving force of the engine 160 is not used for the power generation in the first motor generator 130. Thus, the SOC continues to decrease from time t2 to time t3.

The catalyst warm-up is completed at time t3. At this time, the SOC takes a minimum value MIN2. Because the catalyst warm-up is completed, the electric storage device 110 starts to be charged. Thus, the SOC turns from decrease to increase. Because the starting threshold value ON2 is smaller than the starting threshold value ON1, the period from time t1 to time t2 in FIG. 3 is longer than the period from time t1 to time t2 in the first examination case (refer to FIG. 2).

The SOC reaches the stopping threshold value OFF at time t4. Thus, the engine 160 is controlled to stop. Thus, the SOC turns from increase to decrease. Because the starting threshold value ON2 is smaller than the starting threshold value ON1, the minimum value MIN2 is smaller than the minimum value MIN1. (refer to FIG. 2). Thus, the period from time t3 to time t4 in FIG. 3 is longer than the period from time t3 to time t4 in the first examination case (refer to FIG. 2). Because the control over the engine 160 from time t5 onward is the same as the control from time t2 to time t5, no detailed description is repeated.

The catalyst warm-up is carried out when the engine is started. Usually, the fuel injection amount is increased when the engine is started. Thus, the fuel consumption increases as the engine 160 is started more frequently. From a different point of view, the driving force of the engine 160 is not used for the power generation in the first motor generator 130 during catalyst warm-up. Thus, the power generation efficiency (the amount of fuel consumption in the engine 160 required to generate electric power that is generated by the first motor generator 130) decreases as the engine 160 is started more frequently.

The period for which the engine 160 is stopped in the first embodiment is longer than that in the first examination case by the period during which the SOC decreases from the starting threshold value ON1 to the starting threshold value ON2 (the period that is indicated by double-headed arrows in FIG. 3). Also, the period for which the engine 160 is operating is longer than that in the first examination case by the period during which the SOC increases from the starting threshold value ON2 to the starting threshold value ON1 (the period that is likewise indicated by double-headed arrows in FIG. 3). Thus, according to the first embodiment, the period with which the engine 160 is started and stopped can be longer than that in the first examination case. Thus, the frequency at which the engine 160 is started can be reduced. As a result, the fuel consumption can be reduced. In other words, the power generation efficiency can be improved.

A second embodiment is next described. In the first embodiment, a case where power supply to the outside of the vehicle is continued is described. On the other hand, there may be a case where a short-term external power supply must be repeated. The control over the engine in a second examination case, which is performed in such a case, is described as an example for comparison. The configuration of the vehicle according to the second embodiment (and in the second examination case) is the same as that of the vehicle according to the first embodiment (refer to FIG. 1).

In the second examination case, a case where the on and off of the power supply request signal REQ is switched in relatively short periods of time when the vehicle is in the CS mode is discussed. Every time the power supply request signal REQ is switched from off to on, the engine is, in response thereto, controlled to start and perform catalyst warm-up.

Figure 4:
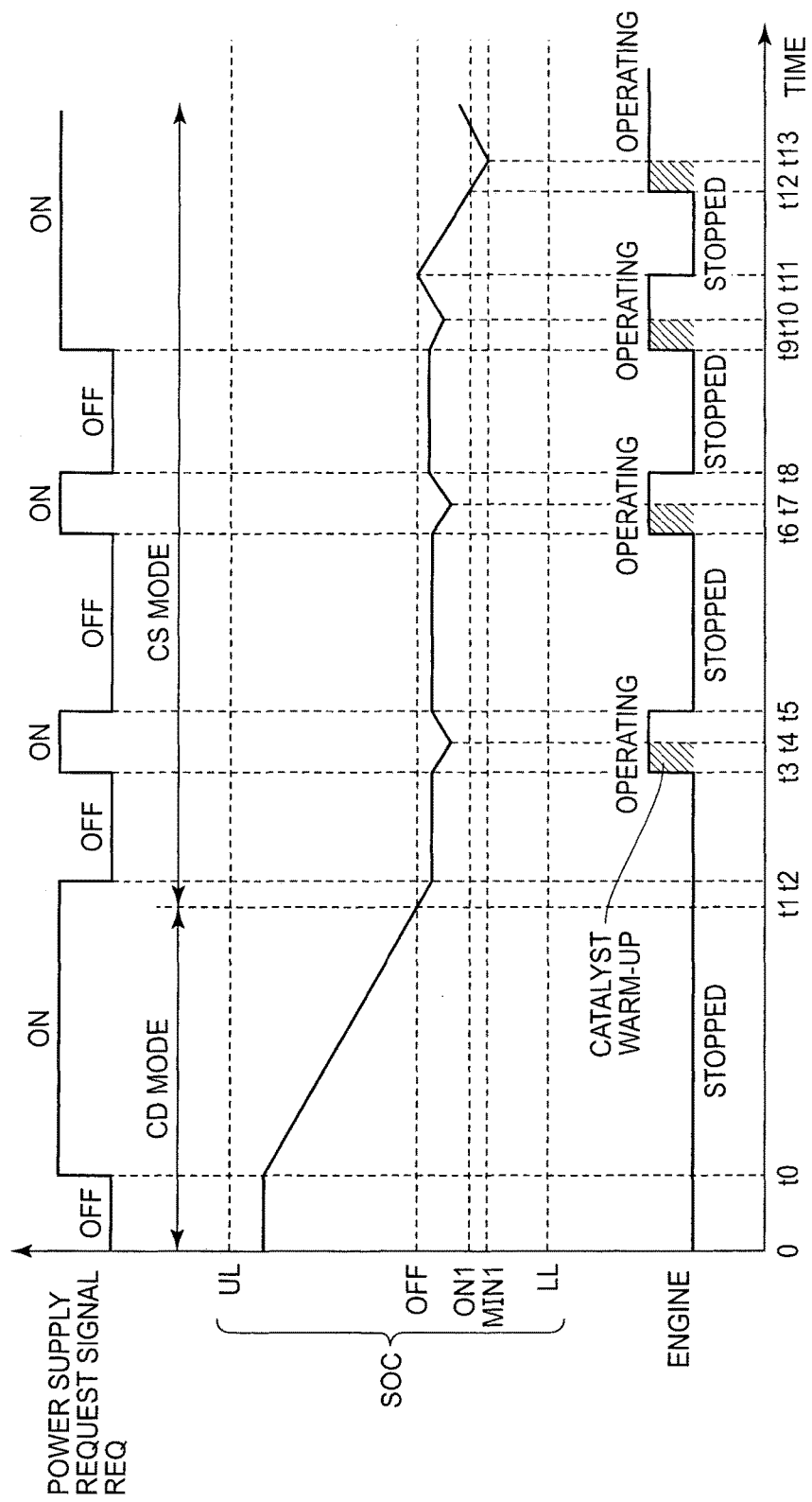
FIG. 4 is a timing chart that shows the control over the internal combustion engine during power supply to the outside of the vehicle in a second examination case.

FIG. 4 is a timing chart that shows the control over the engine 160 during external power supply in the second examination case. Referring to FIG. 4, because the control until time t1 is the same as the control until time t1 in the first examination case (refer to FIG. 2), no detailed description is repeated.

The power supply request signal REQ is turned off at time t2. Because the external power supply is stopped accordingly, the SOC remains constant from time t2 to time t3.

The power supply request signal REQ is turned on at time t3. Then, external power supply is started again and the engine 160 is controlled to start in order to warm up the catalyst converter 72. Because the driving force of the engine 160 is not used for power generation in the first motor generator 130 during catalyst warm-up, the SOC decreases from time t3 to time t4.

The catalyst warm-up is completed at time t4. Because the catalyst warm-up is completed, the electric storage device 110 starts to be charged. Thus, the SOC turns from decrease to increase.

The power supply request signal REQ is turned off at time t5. Because the external power supply is stopped accordingly, the SOC remains constant from time t5 to time t6. Because the control from time t5 to time t9 is the same as the control from time t2 to time t5, no detailed description is repeated. From time t9 onward, the power supply request signal REQ is maintained on. Thus, because the control from time t9 onward is the same as the control from time t4 onward in the first examination case, no detailed description is repeated.

As described above, in the second examination case, catalyst warm-up is carried out regardless of the SOC when the vehicle is in the CS mode. Thus, when a short-term external power supply is repeated, the engine is controlled to start and perform catalyst warm-up every time an external power supply is provided.

In contrast, according to the second embodiment, a starting threshold value ON2 is set as in the case of the first embodiment. In addition, the engine is controlled such that catalyst warm-up is not carried out during external power supply except in the case where the SOC reaches the starting threshold value ON2.

Figure 5:
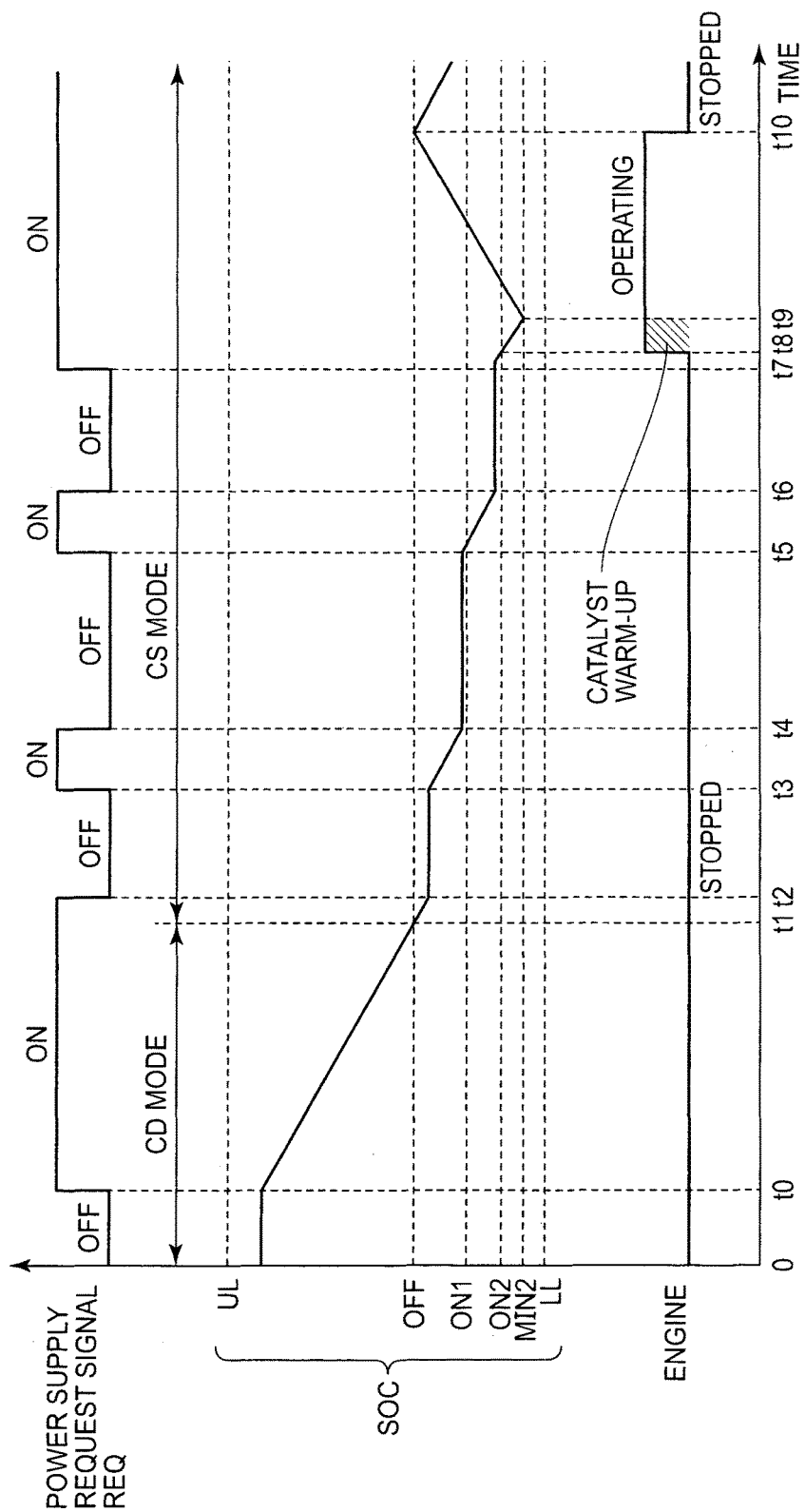
FIG. 5 is a timing chart that shows the control over the internal combustion engine during power supply to the outside of the vehicle in a second embodiment.

FIG. 5 is a timing chart that shows the control over the engine 160 during external power supply in the second embodiment. FIG. 5 is compared to FIG. 4. Because the control until time t3 in FIG. 5 is the same as the control until time t3 in the second examination case (refer to FIG. 4), no detailed description is repeated.

The power supply request signal REQ is turned on at time t3. However, because the SOC is higher than the starting threshold value ON2, catalyst warm-up is not carried out. In other words, the engine 160 is controlled not to start. Because the engine 160 is not started, charging of the electric storage device 110 using the electric power that is generated in the first motor generator 130 is not carried out. Thus, while the power supply request signal REQ is on, the SOC continues to decrease.

The power supply request signal REQ is turned off at time t4. Because the external power supply is stopped accordingly, the SOC remains constant from time t4 to time t5. Because the control from time t5 to time t7 is the same as the control from time t3 to time t5, no detailed description is repeated.

The SOC reaches the starting threshold value ON2 at time t8. When the SOC reaches the starting threshold value ON2, the engine 160 is controlled to start to perform catalyst warm-up. Because the driving force of the engine 160 is not used for power generation in the first motor generator 130 during catalyst warm-up, the SOC decreases from time t8 to time t9.

The catalyst warm-up is completed at time t9. At this time, the SOC takes a minimum value MIN2. Because the catalyst warm-up is completed, the electric storage device 110 starts to be charged. Thus, the SOC turns from decrease to increase. Because the control from time t9 onward in FIG. 5 is the same as the control from time t3 onward in the first embodiment (refer to FIG. 3), no detailed description is repeated.

The reason why the engine is started for catalyst warm-up when the vehicle is in the CS mode in the second examination case that is shown in FIG. 4 is described. As described above, the engine is controlled, during catalyst warm-up, to discharge exhaust gas that can be purified by the catalyst converter 72 still in the process of being warmed up. Thus, the driving force of the engine cannot be used to drive the vehicle during catalyst warm-up. Thus, the vehicle travels on the electric power that has been stored in the electric storage device until the catalyst warm-up is completed. In other words, the vehicle can travel using the driving force of the engine by completing the catalyst warm-up in advance before the vehicle starts to travel. In this case, the SOC can be maintained while the vehicle is traveling in the CS mode. As described above, in the second examination case, the difference in situation, i.e., whether the vehicle is traveling or providing an external power supply, is not reflected in the control over the engine as in the case of the first examination case that is shown in FIG. 2.

However, there is no need to take the maintenance of SOC into consideration as in the case where the vehicle is traveling when an external power supply is provided. Thus, according to the second embodiment, a warm-up operation is carried out depending on the SOC during external power supply. In other words, the ECU 300 prohibits catalyst warm-up until the SOC of the electric storage device 110 reaches the starting threshold value ON2. As a result, the number of times a warm-up operation is carried out can be reduced compared to the second examination case. Thus, the fuel consumption during power supply to the outside of the vehicle can be further reduced.

Figure 6:
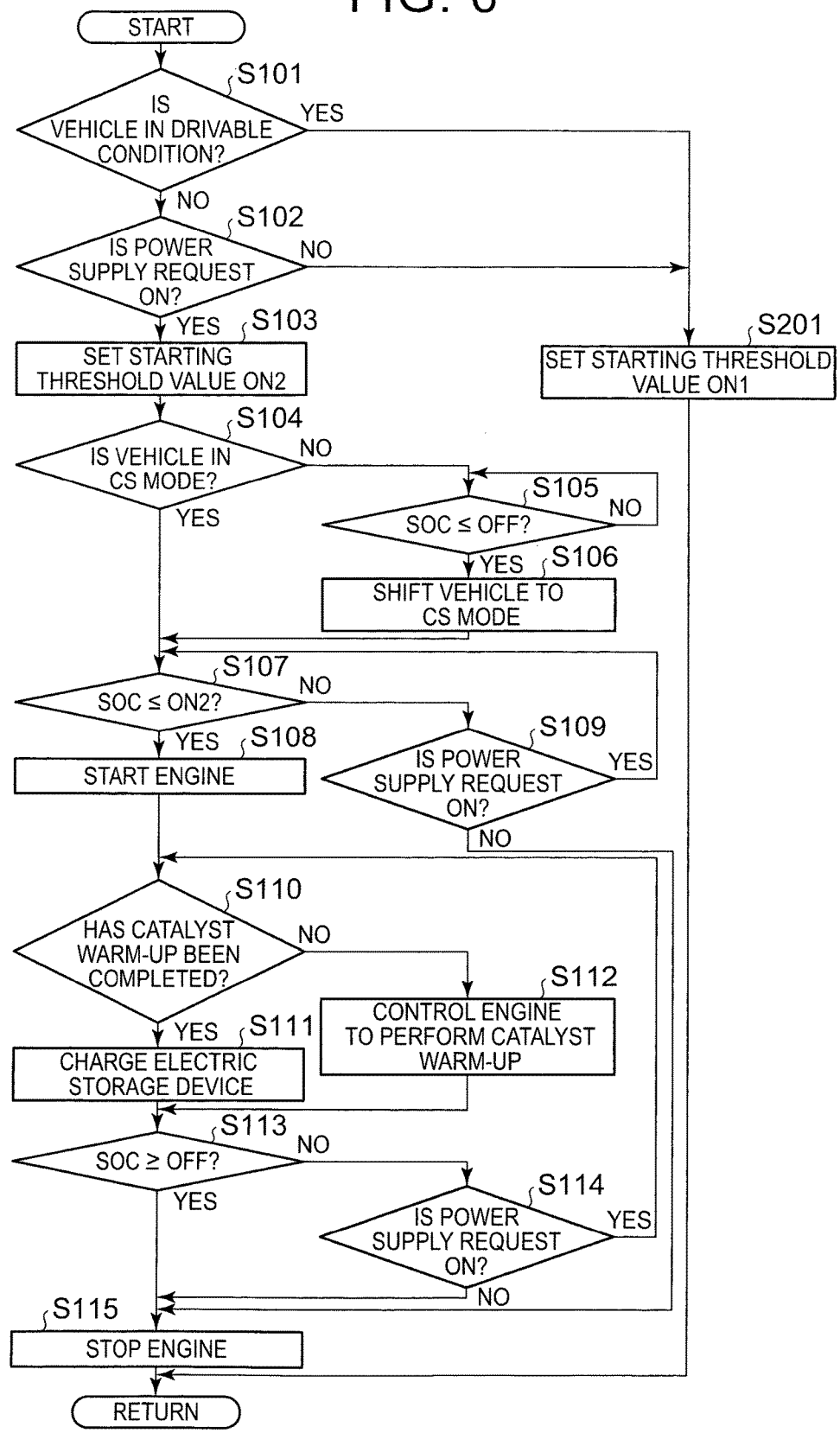
FIG. 6 is a flowchart that is used to explain the flow of processing in the timing charts that are shown in FIG. 3 and FIG. 5.

FIG. 6 is a flowchart that is used to explain the flow of processing in the timing charts that are shown in FIG. 3 and FIG. 5. Referring to FIG. 6, the processing in the flowchart is executed when a predetermined condition is fulfilled. When a predetermined condition is fulfilled means when the vehicle 100 is shifted to the Ready ON state, for example.

In step S101, the ECU 300 determines whether the vehicle 100 is in a drivable condition. More specifically, the ECU 300 determines that the vehicle 100 is in an undrivable condition when the coupling connector 410 of the connection cable 400 is connected to the connection part 220 (when the ECU 300 is receiving the connection signal CNCT from the connection part 220), for example. In this case (NO in step S101), the control goes to step S102. On the other hand, when the coupling connector 410 of the connection cable 400 is not connected to the connection part 220 (when the ECU 300 is not receiving the connection signal CNCT from the connection part 220), the ECU 300 determines that the vehicle 100 is in a drivable condition. In this case (YES in step S101), the control goes to step S201.

In step S102, the ECU 300 determines whether there is a power supply request from the external device 500. When there is a power supply request (in other words, when the power supply request signal REQ is on, i.e., YES in step S102), the control goes to step S103. On the other hand, when there is no power supply request (in other words, when the power supply request signal REQ is off, i.e., NO in step S102), the control goes to step S201.

In step S201, the ECU 300 sets a starting threshold value ON1. In other words, a starting threshold value ON1 is set when the vehicle 100 is in a drivable condition. After that, the series of processing is repeated.

In step S103, the ECU 300 sets a starting threshold value ON2. In other words, a starting threshold value ON2 is set when the vehicle 100 is in an undrivable condition and there is a power supply request. After that, the control goes to step S104.

In step S104, the ECU 300 determines whether the vehicle 100 is in the CS mode or CD mode. When the vehicle 100 is in the CS mode (YES in step S104), the control goes to step S107. On the other hand, when the vehicle 100 is in the CD mode (NO in step S104), the control goes to step S105.

In step S105, the ECU 300 determines whether the SOC is equal to or lower than the stopping threshold value OFF. When the SOC is equal to or lower than the stopping threshold value OFF (YES in step S105), the control goes to step S106. When the SOC is higher than the stopping threshold value OFF (NO in step S105), the control returns to step S105.

In step S106, the vehicle 100 is shifted from the CD mode to the CS mode. After that, the control goes to step S107.

In step S107, the ECU 300 determines whether the SOC has reached the starting threshold value ON2. When the SOC is equal to or lower than the starting threshold value ON2 (YES in step S107), the control goes to step S108. On the other hand, When the SOC is higher than the starting threshold value ON2 (NO in step S107), the control goes to step S109.

In step S108, the ECU 300 starts the engine 160. Then, catalyst warm-up is started.

In step S109, the ECU 300 determines whether there is a power supply request. When there is a power supply request (YES in step S109), the control returns to step S107. Then, the supply of electric power from the electric storage device 110 is continued. On the other hand, when there is no power supply request (NO in step S109), the control goes to step S115.

In step S110, the ECU 300 determines whether the catalyst warm-up has been completed. More specifically, the ECU 300 determines that the catalyst warm-up has been completed when the temperature Tc from the temperature sensor 74 is higher than a predetermined temperature that is high enough for the catalyst converter 72 to fulfill its purifying function. On the other hand, when the temperature Tc is equal to or lower than the predetermined temperature, the ECU 300 determines that the catalyst warm-up has not been completed. When the catalyst warm-up has been completed (YES in step S110), the control goes to step S111. On the other hand, when the catalyst warm-up has not been completed (NO in step S110), the control goes to step S112.

In step S111, the electric storage device 110 starts to be charged. After that, the control goes to step S113.

In step S112, the catalyst warm-up by the engine 160 is continued. After that, the control goes to step S113.

In step S113, the ECU 300 determines whether the SOC has reached the stopping threshold value OFF. When the SOC is equal to or higher than the stopping threshold value OFF (YES in step S113), the control goes to step S115. On the other hand, when the SOC is lower than the stopping threshold value OFF (NO in step S113), the control goes to step S114.

In step S114, the ECU 300 determines whether there is a power supply request. When there is a power supply request (YES in step S114), the control returns to step S110. On the other hand, when there is no power supply request (NO in step S114), the control goes to step S115.

In step S115, the ECU 300 stops the engine 160. After that, the series of the processing that is shown in FIG. 6 is repeated.

A configuration having two pairs of an inverter and a motor generator (a pair of the inverter 122 and the first motor generator 130, and a pair of the inverter 123 and the second motor generator 135) is shown in the first and second embodiments. However, the number of pairs of an inverter and a motor generator is not specifically limited and may be one or three or more.

The determination on whether warm-up of the catalyst converter 72 has been completed may not necessarily be made based on the temperature Tc of the catalyst converter 72 as long as it can be determined whether the catalyst converter 72 is fulfilling a predetermined purifying function. For example, the ECU 300 may determine whether warm-up of the catalyst converter 72 has been completed by measuring the elapsed time after the start of the engine 160.

It should be understood that the embodiments that are disclosed herein are not limitative but illustrative in all respects. The scope of the present invention is defined by the appended claims, and is intended to encompass all modifications within the meaning and range equivalent to the claims.

The invention claimed is:

1. A vehicle, comprising:
   an internal combustion engine;
   a power generator configured to generate electric power using power of the internal combustion engine;
   an electric storage device configured to store electric power that is generated by the power generator;
   an external power supply part provided in an outer surface of the vehicle, the electric power stored in the electric storage device being supplied to the outside of the vehicle through the external power supply part; and
   a controller configured to:
   (a) start the internal combustion engine when a state of charge of the electric storage device reaches a predetermined lower limit value, and
   (b) set a first lower limit value used when the vehicle is in an undrivable condition, while electric power is supplied to the outside of the vehicle through the external power supply part, to a value smaller than a second lower limit value used when the vehicle is in a drivable condition, wherein the controller determines that the vehicle is in the drivable condition when a coupling connector that is configured to supply electric power from the vehicle to an external device is not connected to the vehicle and the drivable condition includes a state when the vehicle is stopped, as long as the coupling connector is not connected to the vehicle.

2. The vehicle according to claim 1, further comprising;
   a catalyst device configured to purify an exhaust gas discharged from the internal combustion engine, wherein
   the internal combustion engine warms up the catalyst device using the exhaust gas, and
   the controller prohibits a warm-up of the catalyst device by the internal combustion engine until the state of charge of the electric storage device reaches the second lower limit value.

3. The vehicle according to claim 1, wherein in the undrivable condition, the coupling connector that is configured to supply electric power from the vehicle to an external device is connected to the vehicle.

4. A vehicle, comprising:
   an internal combustion engine;
   a power generator configured to generate electric power using power of the internal combustion engine;
   an electric storage device configured to store electric power generated by the power generator;
   an external power supply part provided in an outer surface of the vehicle, the electric power stored in the electric storage device being supplied to the outside of the vehicle through the external power supply part; and
   a controller configured to:
   (a) set a first threshold value as a threshold value when the vehicle is in an undrivable condition, while electric power is supplied to the outside of the vehicle through the external power supply part,
   (b) set a second threshold value as the threshold value when the vehicle is in a drivable condition, the first threshold value being less than the second threshold value, and
   (c) start the internal combustion engine when a state of charge of the electric storage device reaches the threshold value, wherein the controller determines that the vehicle is in the drivable condition when a coupling connector that is configured to supply electric power from the vehicle to an external device is not connected to the vehicle and the drivable condition includes a state when the vehicle is stopped, as long as the coupling connector is not connected to the vehicle.

5. A controller for a vehicle, the vehicle including an internal combustion engine, a power generator, an electric storage device, and an external power supply part, the power generator being configured to generate electric power using power of the internal combustion engine, the electric storage device being configured to store electric power that is generated by the power generator, and the external power supply part being provided in an outer surface of the vehicle, the electric power stored in the electric storage device being supplied to the outside of the vehicle through the external power supply part, the controller comprising:

an ECU configured to
(a) start the internal combustion engine when a state of charge of the electric storage device reaches a predetermined lower limit value, and
(b) set a first lower limit value used when the vehicle is in an undrivable condition, while electric power is supplied to the outside of the vehicle through the external power supply part, to a value smaller than a second lower limit value used when the vehicle is in a drivable condition, wherein the controller determines that the vehicle is in the drivable condition when a coupling connector that is configured to supply electric power from the vehicle to an external device is not connected to the vehicle and the drivable condition includes a state when the vehicle is stopped, as long as the coupling connector is not connected to the vehicle.

6. A control method for a vehicle, the vehicle including an internal combustion engine, a power generator, an electric storage device, an external power supply part, and an ECU, the power generator being configured to generate electric power using power of the internal combustion engine, the electric storage device being configured to store electric power that is generated by the power generator, and the external power supply part being provided in an outer surface of the vehicle, the electric power stored in the electric storage device being supplied to the outside of the vehicle through the external power supply part, the control method comprising:
(a) starting the internal combustion engine, by the ECU, when a state of charge of the electric storage device reaches a predetermined lower limit value, and
(b) setting a first lower limit value used when the vehicle is in an undrivable condition, while electric power is supplied to the outside of the vehicle through the external power supply part, by the ECU, to a value smaller than a second lower limit value used when the vehicle is in a drivable condition, wherein the controller determines that the vehicle is in the drivable condition when a coupling connector that is configured to supply electric power from the vehicle to an external device is not connected to the vehicle and the drivable condition includes a state when the vehicle is stopped, as long as the coupling connector is not connected to the vehicle.

* * * * *